Sept. 2, 1941.    O. WARWICK    2,254,586
TOOL
Filed Oct. 25, 1937

INVENTOR.
ORLO WARWICK
BY
Philip S. Hopkins
ATTORNEY.

Patented Sept. 2, 1941

2,254,586

UNITED STATES PATENT OFFICE 2,254,586

TOOL

Orlo Warwick, Endicott, N. Y.

Application October 25, 1937, Serial No. 170,908

1 Claim. (Cl. 7—14.1)

This invention relates to tools and more particularly to a type of tool having a cutting edge adapted to be used in association with a pick or similar handled tool.

A primary object of this invention is the provision of an auxiliary tool provided with a cutting edge adapted to be positioned on the prong of a pick in order to provide a cutting edge which may be utilized in conjunction with the pick, as an axe for any one of a variety of uses.

A further object is the provision of an auxiliary tool which occupies little space and which may be readily engaged with or disengaged from, an additional tool such as a pick or crowbar or other analogous devices to provide an auxiliary blade therefor, thus amplifying the number of uses to which the said additional tool may be put.

A more specific object is the provision of such an auxiliary tool so arranged that upon positioning the same on one prong of a pick the cutting edge of the blade will be in parallel relationship to the length of the pick handle and upon positioning the same upon the other prong of the pick the cutting edge of the tool will be in right angled relationship to the length of the pick handle.

An additional object is the provision of an auxiliary tool which may be simply and inexpensively manufactured, which is durable and sturdy in construction and which may be readily associated with or disassociated from a handled tool adapted for use therewith.

As conducive to a clearer understanding of this invention it may here be pointed out that in digging operations of any sort there are frequently times when a cutting edge is indispensable, as in cutting through roots, or removing sod, or under similar circumstances. Heretofore it has been necessary that a workman or work crew carry axes or analogous tools for this purpose, such axes occupying, as will be understood, a relatively large amount of space in the work truck or providing an additional tool for the workman to carry. An object of the instant invention, therefore, is the provision of a tool to provide a necessary cutting edge as may be required which will occupy a relatively small amount of space in the work truck, or may be readily carried by the workman without imposing the additional burden of another heavy tool upon him.

Furthermore by this invention it is possible to provide a tool which has advantages not obtained in connection with an ordinary axe in that, if desired, the blade may be disposed upon a pick in right angled relationship with the handle, which may be of considerable value in such operations as removing sod, for example.

The same tool may also have additional utility in that it may be applied to other handled instruments, such as crowbar and utilized as an ice scraper or for any other desired purpose.

Other objects will in part be obvious and in part be pointed out hereinafter.

The invention accordingly consists in the combinations of elements, arrangements of parts and features of construction all as will be pointed out hereinafter and disclosed in the accompanying drawing wherein:

Figure 1 discloses one form of device embodying the principles of this invention applied to one prong of a conventional pick.

Figure 2 discloses a side elevation of the device shown in Figure 1 applied to the opposite prong of a conventional pick.

Similar reference characters refer to similar parts throughout the several views of the drawing.

Figure 3:
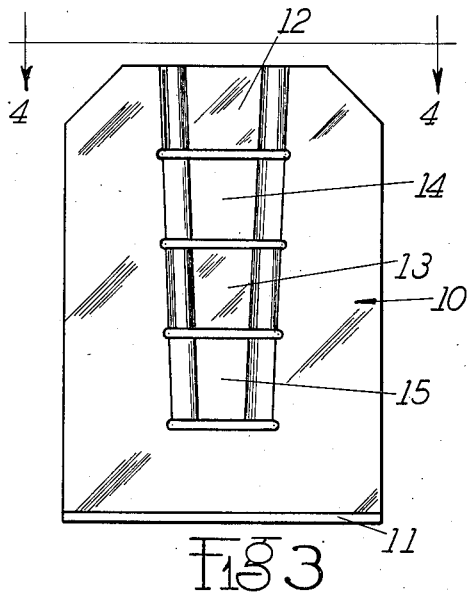
Figure 3 is an enlarged side elevation of one form of tool embodying the principles of this invention.

Having specific reference to Figure 3 there is disclosed a tool, generally indicated at 10 which may be comprised of cast metal or other desirable substance provided at its lower extremity with a cutting edge 11 which may or may not be of tempered steel as desired.

Figure 4:
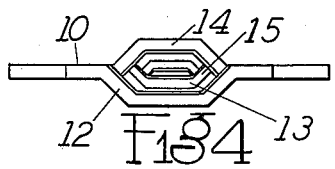
Figure 4 is a top elevational view of the device of Figure 3 taken along the line 4—4 of Figure 3.

A plurality of convolutions are preformed in the metal of tool 10 and may be comprised of a pair of outwardly flared portions 12 and 13 and an opposed pair of oppositely flared portions 14 and 15 alternately disposed with respect to the first named portions (see Figure 4). As best shown in Figures 3 and 4 these opposed flared portions form a tapered, non-circular pocket adapted for the reception of any tapered tool.

Figure 1:
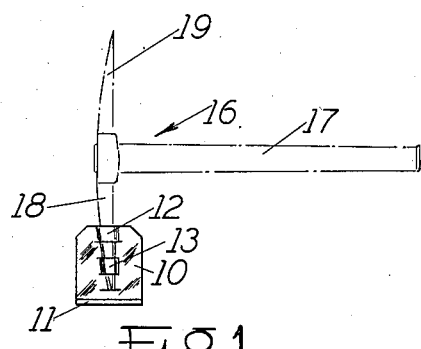
Figure 2:
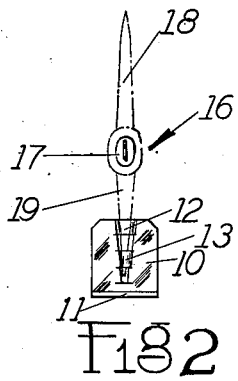

Referring now to Figure 1 there is generally indicated at 16 a conventional pick comprised of a handle 17, a pointed prong 18 and a prong provided with a blade 19. The tapered pocket comprised of flared portions 12, 13, 14 and 15 is so arranged that when pointed prong 18 is inserted therein the dimensions of the pocket are such that the flanges tightly engage, in frictional relation, the conventional tapered sides of the prong to hold the parts in rigid related assembly, and the dimensions of the pocket are such as to accommodate the pointed prong only in such position that the axis of cutting edge 11 is disposed parallel to the length of pick handle 17 (see Figure 1). When, however, the bladed prong of the pick 19 is inserted into the aperture the size of the bladed prong 19 is such as to preclude positioning of the tool of this invention in the position shown in Figure 1 but the dimensions of the pocket formed by flared portions are such as to accommodate bladed prong 19 in the position shown in Figure 2, whereby blade 11 is disposed in right angled relation to the handle 17. This configuration of the pocket is best shown in Figure 4, wherein it will be seen that the aperture at the top of the pocket is hexagonal. The distance between the ends of the hexagon so formed is sufficient to accommodate the bladed prong of the pick when the same is properly positioned, that is with the pick handle at substantially a right angle to the cutting edge of the tool. However, the distance between the sides (of the two ends) of the pocket is less than the width of the pick blade being of a width just sufficient to accommodate the pointed prong. The taper of the pocket, in combination with the dimension of the top aperture, thus permits the two pick prongs to be accommodated in the pocket only in the relation above set forth, since the blade of the pick is too wide to fit into the pocket when the handle of the pick is in parallel relation to the cutting edge of the blade and since the taper of the pocket towards the bottom thereof precludes entrance of the pointed prong to the bottom of the pocket, due to the fact that in a normal pick construction the taper of the pointed prong is more pronounced in a direction parallel to the pick handle than in the direction at right angles thereto. It is to be further observed that the opposing pair of side walls forming the pocket portion and extending parallel to the cutting edge of tool 10 are spaced apart a distance appreciably less than their individual lengths, as seen in Fig. 4, and the end walls connecting said side walls are shaped and arranged to provide laterally and longitudinally converging grooves.

Figure 5:
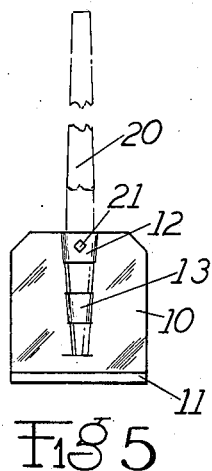
Figure 5 is a side elevational view of the device of Figures 1 to 4 as applied to a crowbar or other device.

In Figure 5 there is disclosed a conventional crowbar 20 or other pointed instrument showing that the tapered pocket formed by the flared members 12, 13, 14 and 15 may also serve to hold the tool of the instant invention in related assembly with any other desired handled tool.

It will be understood, of course, that if desirable any suitable additional securing means other than the normal friction of the flared pocket, such as a set screw 21 may be utilized to secure the tool in related assembly with its associated pointed instrument. However, in normal practice it has been found preferable to preform the tapered pocket of such a dimension that the frictional engagement of the parts is sufficient to hold the tool and its associated pick prong or other member in related assembly.

Thus, from the foregoing, it will be seen that there is herein provided a device which accomplishes all the objects of this invention including many advantages of great practical utility.

As many embodiments may be made of this invention and as many modifications may be made in the embodiment herein described and shown in the accompanying drawing, it is to be understood that all matter herein set forth and shown is to be interpreted merely as illustrative and not in a limiting sense.

I claim as my invention:

In combination with a pick having a bladed prong and a pointed prong, a tool having an approximately straight cutting edge and a noncircular pocket portion tapering toward its cutting edge, said pocket portion having a pair of opposing side walls extending parallel to the cutting edge of the tool and spaced apart a distance appreciably less than their individual lengths to receive snugly and frictionally retain the bladed prong only when the latter is in parallel relation to the cutting edge of the tool, and end walls shaped and arranged to provide laterally and longitudinally converging grooves connecting the opposing side walls at both ends and spaced to snugly fit and permit full insertion of the pointed prong of the pick in the pocket portion and to cooperate with the side walls in frictionally retaining the same when the tool is in a position at right angles to its bladed prong engaging position.

ORLO WARWICK.